United States Patent [19]
Smith

[11] 3,979,355
[45] Sept. 7, 1976

[54] ARSONIUM LATENT CATALYSTS FOR CURING EPOXY RESINS

[75] Inventor: James D. B. Smith, Turtle Creek, Pa.

[73] Assignee: Westinghouse Electric Corporation, Pittsburgh, Pa.

[22] Filed: Feb. 13, 1974

[21] Appl. No.: 442,266

[52] U.S. Cl................... 260/37 EP; 260/47 EA; 260/59 EP; 260/78.41; 260/830 TW; 336/96
[51] Int. Cl.².................................. C08G 51/04
[58] Field of Search .......... 260/47 EA, 59, 78.4 EP, 260/37 EP, 18 PF, 440; 252/431 R, 830 TW

[56] References Cited
UNITED STATES PATENTS

| | | | |
|---|---|---|---|
| 2,928,809 | 3/1960 | Hicks | 260/47 |
| 3,547,885 | 12/1970 | Dante et al. | 260/47 |
| 3,637,572 | 1/1972 | Ogata et al. | 260/37 EP |
| 3,720,634 | 3/1973 | Statton | 260/18 PF |
| 3,784,583 | 1/1974 | Smith | 260/47 EA |

*Primary Examiner*—Murray Tillman
*Assistant Examiner*—T. Pertilla
*Attorney, Agent, or Firm*—D. P. Cillo

[57] ABSTRACT

A resinous composition, suitable for insulating electrical members, is made from a mixture containing about 100 parts of an epoxy resin, about 55 to 165 parts of an acid anhydride and about 0.04 to 0.5 parts of a quaternary organic arsonium compound acting as a latent catalyst.

23 Claims, 1 Drawing Figure

ARSONIUM LATENT CATALYSTS FOR CURING EPOXY RESINS

BACKGROUND OF THE INVENTION

To improve high temperature stability over amine cured epoxy resin systems and to give better physical and electrical properties, it has been the general practice in the epoxy technological field to use anhydride curing agents with glycidyl ether epoxy resins. Most anhydride formulations require elevated-temperature cures, and for most commercial applications, it is necessary to add some form of catalyst to speed the rate of cure. Consequently, a considerable amount of effort has been devoted in recent years to develop a perfect latent catalyst for curing glycidyl ether epoxy resins.

The properties desired of such a latent catalyst are the following:

a. It should give rapid cure of epoxy resins at moderately elevated temperatures (i.e., 135° – 180°C).
b. It should be completely miscible with the resins at all temperatures.
c. The storage life of the catalyzed resin should be indefinite. In practice, the viscosity of the resin should not change appreciably at room temperature after periods of 1 to several months.
d. It should not adversely affect the properties of the cured resin. In particular, the electrical and mechanical properties of the resin should not be affected by the catalyst.

Several latent catalysts have appeared on the commercial scene in recent years. Included are quaternary ammonium halides such as benzyltrimethyl-ammonium chloride, stannous octoate, "extra-coordinate" siliconate salts, triethanolamine borate, triethanolamine titanate and various other metal chelates. However, all of these materials have been rejected for one reason or another and the quest for improved, perfect latent catalysts for anhydride cured glycidyl ether epoxy resins continues. Dante et al., U.S. Pat. No. 3,547,885, taught tetraphosphonium halide catalysts, but these proved to be of an ionic nature, subject to decomposition. Smith in U.S. Pat. No. 3,784,583, assigned to the assignee of this invention, taught quaternary organic phosphonium propionates, acetates, butyrates, isobutyrates and dimethyl phosphates as particularly effective latent catalysts.

It is believed that the prior art tetraphosphonium halides, like quaternary ammonium halides, decompose during cure to form organo-phosphine or amine compounds and halide salts. The inorganic salt fragments are not bound tightly to the epoxy resin and are free to react with moisture to form strong acids which could harm encapsulated electrical components. The prior art non-halide quaternary phosphonium slats are more thermally stable, due apparently to their more covalent bonding character, and appear to decompose only to a small extent on cure, forming organic rather than inorganic fragments. The need continues, however, for even more effective materials.

SUMMARY OF THE INVENTION

It has been discovered that quaternary organic arsonium compounds will behave as latent catalysts for glycidyl ether epoxy resins, when used in certain weight proportions with an acid anhydride. The effective weight ratio glycidyl ether epoxy resin:acid anhydride:quaternary organic arsonium compound is 100:55 to 165:0.04 to 0.50.

Very good storage properties at ambient temperatures have been found, consequently, long life one-component resin formulations employing these accelerators are possible. Electrical measurements on the cured system show relatively low dielectric constants and power factor values, even at temperatures up to 150°C.

BRIEF DESCRIPTION OF THE DRAWING

For a better understanding of the invention, reference may be made to the preferred embodiments, exemplary of the invention, shown in the accompanying drawing which is a vertical sectional view through a transformer.

DESCRIPTION OF THE PREFERRED EMBODIMENTS

Figure 1:
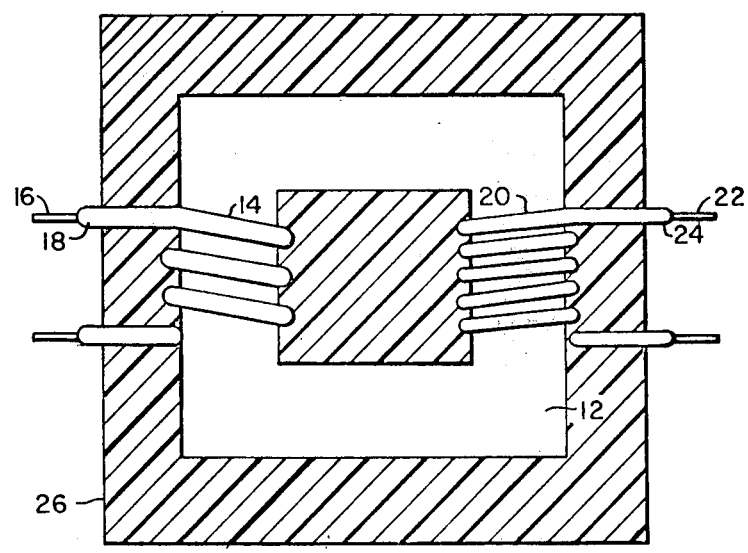

It has been found that quaternary arsonium salts are particularly effective latent catalysts for the anhydride cure of epoxy casting compositions used in encapsulating electrical devices. At concentrations of about 0.04 to 0.50 parts quaternary arsonium compound per 100 parts epoxy resin, rapid gel times in the temperature range of 135° to 170°C are possible. The term "latent catalyst" is taken to mean the ability of these quaternary arsonium compounds to speed up curing rates at elevated temperatures (e.g. over 100°C) while exhibiting little or no cure at room temperature, thus giving good storage properties.

The quaternary arsonium compounds have the general structural formula:

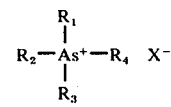

where $R_1$, $R_2$, $R_3$ and $R_4$ are aryl radicals or alkyl radicals havng 1 to 21 carbon atoms with preferred alkyl radicals having 4 to 12 carbons. X, bonded to the arsenic atom, is a halogen, preferably Cl, Br or I.

The reaction mechanism which makes these quaternary arsonium compounds such potent catalysts for anhydride cured epoxy resins is not completely clear at this time. The quaternary arsonium compounds of this invention apparently have a more covalent bonding character than non-halide quaternary phosphonium salts, and so the quaternary arsonium halides are useful as latent catalysts. The quaternary arsonium halides, such as chlorine, bromine or iodine decompose only to a very small extent on cure.

The quaternary arsonium compounds of this invention also appear to have a cation that is not large enough to cause steric hinderance effects, i.e. the arsonium ion is not large enough to cause the compounds to lose their catalytic effect. Thus, the effectiveness of onium compounds as latent catalysts for resins used to encapsulate electrical devices appears to be a function of covalent bonding character and cation size.

The quaternary arsonium compounds must be mixed in critical proportions with the epoxy-anhydride system. The useful weight percent range of ingredients, to provide a good compromise of cure time, storage pot life and electrical and mechanical properties, is an epoxy resin:acid anhydride: quaternary organic arsonium compound ratio of 100:55 to 165:0.04 to 0.50, with a preferred range of about 100:55 to 165:0.5 to 0.30 respectively. Some examples of suitable quaternary arsonium compounds which may be used alone or in admixtures would include, for example, triphenylarsonium methyl iodide and tetraphenylarsonium chloride.

The glycidyl polyether of a dihydric phenol which is preferably employed in the invention is obtainable by reacting epichlorhydrin with a dihydric phenol in an alkaline medium at about 50°C, using 1 to 2 or more moles of epichlorhydrin per mole of dihydric phenol. The heating is continued for several hours to effect the reaction, and the product is then washed free of salt and base. The product, instead of being a single simple compound, is generally a complex mixture of glycidyl polyethers, but the principal product may be represented by the formula:

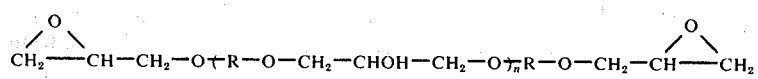

where $n$ is an integer of the series 0, 1, 2, 3 ..., and R represents the divalent hydrocarbon radical of the dihydric phenol. The glycidyl polyethers of a dihydric phenol used in the invention have a 1, 2 epoxy equivalency between 1.0 and 2.0. By the epoxy equivalency, reference is made to the average number of 1, 2 epoxy groups,

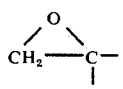

contained in the average molecule of the glycidyl ether. Preferably in the formula above, R is:

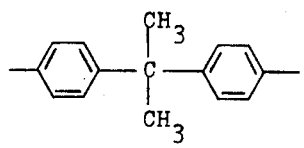

and these glycidyl polyethers are commonly called bisphenol A type epoxy resins. Bisphenol A (p, p'-dihydroxy-diphenyldimethyl methane) is the dihydric phenol used in these epoxides.

Typical epoxy resins of bisphenol A are readily available in commercial quantities and reference may be made to the Handbook of Epoxy Resins by Lee and Neville for a complete description of their synthesis, or to U.S. Pat. Nos.: 2,324,483; 2,444,333; 2,500,600; 2,511,913; 2,558,949; 2,582,985; 2,615,007; and 2,633,458. Other epoxy resins that are useful in this invention and which can be used in place of or mixed with bisphenol A type epoxy resins include aliphatic epoxy resins, cycloaliphatic epoxy resins and polyglycidyl ethers of a novolac. Reference may be made to *Plastic Materials* Chapter 22, by J. A. Brydson, herein incorporated by reference, for a complete description of these latter type epoxy resins.

The polyglycidyl ethers of a novolac suitable for use in accordance with this invention are prepared by reacting an epihalohydrin with phenol formaldehyde condensates. While the bisphenol A-based resins contain a maximum of two epoxy groups per molecule, the epoxy novolacs may contain as many as seven or more epoxy groups per molecule. In addition to phenol, alkyl-substituted phenols such as o-cresol may be used as a starting point for the production of novolac.

The production of the reaction is generally a massive oxidation resistant aromatic compound, one example of which is represented by the formula:

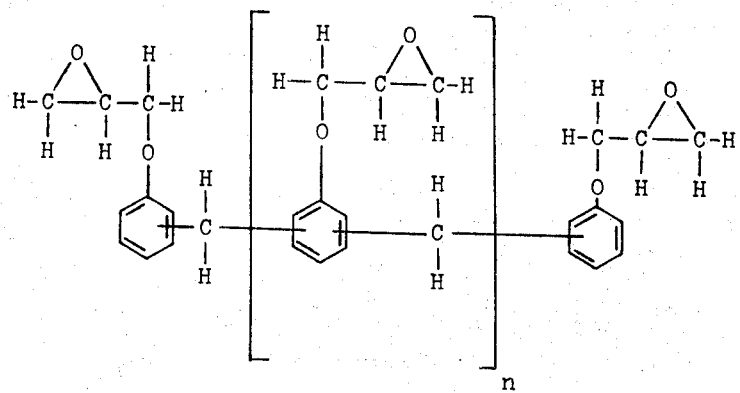

wherein $n$ is an integer of the series 0, 1, 2, 3 etc.

Although novolac resins from formaldehyde are generally preferred for use in this invention, novolac resins from any other aldehyde such as, for example, acetaldehyde, chloraldehyde, butyraldehyde, fufuraldehyde, can also be used. Although the above formula shows a completely epoxidized novolac, other novolacs which are only partially epoxidized can be useful in this invention.

The epoxy resins may be characterized by reference to their epoxy equivalent weight, which is the mean molecular weight of the particular resin divided by the mean number of epoxy units per molecule. In the present invention, the suitable epoxy resins are characterized by an epoxy equivalent weight of from about 130 to about 1200 for the bisphenol A type and from about 100 to 500 for the epoxy novolacs. Within this range there is a preferred range of epoxy equivalent weight of from about 150 to about 800 for the bisphenol A type and from about 125 to 350 for the epoxy novolacs.

These two types of epoxy resins may be used alone or in admixtures in this invention. In the present invention the suitable non-glycidyl ether epoxides are characterized by an epoxy equivalent weight of from about 75 to about 250 for the cycloaliphatic type and from about 75 to about 600 for the acyclic aliphatic type.

The acid anhydrides which are to be used in carrying out the invention include the conventional organic mono- and poly-functional anhydrides. Typical of the mono-functional anhydrides are hexahydrophtalic anhydride, 1-methylhexahydrophthalic anhydride, tetrahydrophthalic anhydride, 1-methyltetrahydrophthalic anhydride, phthalic anhydride, NADIC anhydride, NADIC methylanhydride and the like. Polyfunctional anhydrides which may be employed include pyromellitic dianhydride, polyazelaic polyanhydride, the reaction product of trimellitic anhydride and a glycol, and benzophenone tetracarboxylic acid dianhydride. The anhydride may be used singly or in admixture. The total anhydride content of the epoxy-anhydride mixture must lie within the range of from about 0.5 to about 1.5 anhydride equivalents for each epoxy equivalent.

For a number of purposes the unmodified epoxide resins may be considered to have certain disadvantages. These disadvantages include high viscosity, high cost, and too great a rigidity for specific applications. The resins are therefore modified by incorporation of diluents, flexibilizers and fillers. Epoxy reactive diluents can be particularly useful, and may be employed up to about 70 parts of the epoxide component of the formulation of this invention, to reduce the viscosity of the mixed system, and preferably between about 20 to 50 parts of the 100 parts epoxy resin i.e. a preferred admixture could contain, for example 70 parts bisphenol A epoxy and 30 parts neopentyl glycol aliphatic diepoxide diluent, along with effective amounts of anhydride and arsonium salt. Reactive diluents such as phenyl glycidyl ether, butyl glycidyl ether, other alkyl glycidyl ethers, wherein the alkyl group contains from 5 to 12 carbons, vinyl cyclohexene dioxide, endo-dicyclopentadiene dioxide, octylene oxide and preferably diglycidyl ethers of 1,4-butanediol or neopentyl glycol diglycidyl ether can be used.

Epoxidized natural oil extenders, such as epoxidized linseed or soy bean oils, octyl epoxy tallate and reactive plasticizers such as the conventional phthalates and phosphates may also be used in small amounts, up to about 40 parts per 100 parts epoxy resin to provide increased flexibility. Thixotropic agents, such as $SiO_2$ in gel composition and pigments such as $TiO_2$ may be used as aids in fluidizing the composition or enhancing the color tones of the cured resins. Similarly, various fillers, such as silica, quartz, beryllium aluminum silicate, lithium aluminum silicate and mixtures thereof in average particle sizes from about 10 to 300 microns may be employed up to about 200 parts per 100 parts epoxy resin to improve electrical properties of the resin formulation.

Electrical transformers, rectifiers and electronic components can be potted or cast within the completely reactive catalyzed epoxy resin compositions of this invention.

Referring to the FIGURE of the drawing, there is illustrated a potted transformer 10 which comprises a magnetic core 12 provided with one winding 14 which comprises an electrical conductor 16 which is insulated with insulation 18 and another winding 20 which comprises a conductor 22 also insulated with insulation 24. The magnetic core 12 with its associated windings 14 and 20 disposed about the core are completely potted in the epoxide resin 26 which has been catalyzed with the latent catalyst of this invention.

EXAMPLE 1

A resin formulation was made containing 70 grams of a liquid diglycidyl ether of bisphenol A resin, having an epoxy equivalent weight of 172–176 and a viscosity at 25°C of 4000–5500 cp (sold commercially by Dow Chemical Co. under the tradename DER-332), 30 grams of diglycidyl ether of neopentyl glycol diluent having an epoxy equivalent weight of about 150 and a viscosity at 25°C of 6–8 cp., 100 grams of 1-methyltetrahydrophthalic anhydride hardener and 0.08 grams of triphenylarsonium methyl iodide as latent catalyst (to provide an epoxy resin:acid anhydride:quaternary organic arsonium compound weight ratio of 100:0.08.) The epoxy resin consists of 70 parts glycidyl ether of bisphenol A and 30 parts of neopentyl glycol diglycidyl ether.

The components were poured into a container, stirred at room temperature and then put in a paint mixer for about 5 minutes. Ten gram samples were then poured into 19 × 150 m.m. test tubes. These samples were placed in a 170°C constant temperature bath and gel times of the samples recorded using a Sunshine Gel meter. The gel time was the amount of time it took the formulation to start to solidify.

Storage properties of the formulation were found by measuring viscosities at 25°C in Gardner-Holdt bubble tubes. Measurements were usually taken at 1-week intervals. The termination of the catalyzed lifetime (pot-life) of these formulations were considered to be when the viscosity reached a value of 1000 cp. at 26°C.

To evaluate the effect of phosphonium accelerators on the electrical properties of the cured resin, ⅛inch thick castings were cured in an oven using a heating cycle of 16 hours at 135°C plus 4 hours at 150°C. Then 60 Hz power factors (100 × tan δ) and dielectric constant values were obtained at 125°C and 150°C (ASTM designation D150-65T). The results of these tests are recorded in TABLE 1.

EXAMPLE 2

A resin formulation was made using the same ingredients as EXAMPLE 1 except that 0.08 grams of tetraphenylarsonium chloride as latent catalyst was used (to provide an epoxy resin:acid anhydride:quaternary organic arsonium compound weight ratio of 100:100:0.08.) The ingredients were reacted, cured and tests run exactly as in EXAMPLE 1.

EXAMPLE 3

Comparative resin formulations A, B, C, D, E and F were made in this EXAMPLE. To each resin formulation containing 70 grams of DER-332, 30 grams of diglycidyl ether of neopentyl glycol diluent having an epoxy equivalent weight of about 150 and a viscosity at 25°C of 6–8 cp., and 100 grams of 1-methyltetrahydrophthalic anhydride hardener, was added: (A) 0.08 grams of tetrabutyl phosphonium chloride (B) 0.08 grams of triphenylethyl phosphonium iodide (C) 0.08 grams of methyl trioctyl phosphonium dimethylphosphate (D) 0.08 grams of tetraphenyl stibonium (antimony) bromide (E) no catalyst. This provided four formulations having epoxy resin:acid anhydride:quaternary orgnic onium compound weight ratios of 100:100:0.08 and one control formulation containing no latent catalyst.

Formulation (F) contained 70 grams of a liquid diglycidyl ether of bisphenol A resin, having an epoxy equivalent weight of 182–189 and a viscosity at 25°C of 7000–10,000 cp., (sold commercially by Ciba Products Co. under the tradename Araldite 6005), 30 grams of diglycidyl ether of 1,4-butylene glycol diluent having an epoxy equivalent weight of about 150 and a viscosity at 25°C of 15 cp. and 2.0 grams of tetrabutyl phosphonium acetate to provide an epoxy resin:acid anhydride:quaternary organic phosphonium salt weight ratio of 100:0:2.0. The ingredients were reacted, cured and test run exactly as in EXAMPLES 1 and 2.

The results of the tests for gel time, pot life, power factor and dielectric constant for EXAMPLES 1 to 3 are shown below in TABLE 1:

halides are suitable for use as high voltage electrical insulation for high voltage electrical transformers, where Power Factor values at 125°C of up to about 15% are acceptable and values of 5% are optimum. These Power Factor tests indicate that the arsonium compound catalyzed epoxy resins are thermally stable even at 150°C, and the arsonium compound catalysts used in the resin would not appreciably corrode metal such as copper, iron or aluminum insulated conductors nor shorten their lifetime.

EXAMPLE 4

Two resin formulations were made using the same ingredients as in EXAMPLES 1 and 2 except that larger amounts of latent catalyst, (A) 0.16 grams of triphenylarsonium methyl iodide and (B) 0.16 grams of tetraphenylarsonium chloride was used (to provide a

TABLE 1

| Sample EXAMPLE (epoxy: anhydride: onium compound) | Gel Time at 170°C (minutes) | Pot Life at 26°C (days) | 125°C Power Factor (100 × tan δ) | 125°C Dielectric Constant $\epsilon'$ | 150°C Power Factor (100 × tan δ) | 150°C Dielectric Constant $\epsilon'$ |
|---|---|---|---|---|---|---|
| 1-arsonium iodide (100:100:0.08) | 19.9 | 120 | 7.8 | 6.9 | 23.0 | 8.6 |
| 2-arsonium chloride (100:100:0.08) | 14.5 | 140 | 4.2 | 3.9 | 8.6 | 6.2 |
| 3A-phosphonium chloride (100:100:0.08) | — | 60 | — | — | 29.6 | 5.9 |
| 3B-phosphonium iodide (100:100:0.08) | — | — | — | — | 39.4 | 6.3 |
| 3C-phosphonium dimethyl phosphate (100:100:0.08) | 20.2 | — | 8.5 | 3.8 | 8.8 | 4.1 |
| 3D-stibonium bromide (100:100:0.08) | 60+ | — | — | — | — | — |
| 3E- (100:100:0) | 1000+ | 200+ | 4.6 | — | — | — |
| 3F- (100:0.2.0) | 1500+ | — | — | — | — | — |

These results show that the quaternary organic arsonium compounds display high catalytic behavior at low concentrations. Their gel times are comparable to the quaternary organic phosphonium salts and vastly superior to compositions not containing a catalyst (Sample 3E), or those not containing an anhydride (Sample 3F). The results seem to indicate that stibonium bromide is unsuitable as a catalyst. Apparently steric hinderance causes excessive gel time for stibonium bromide latent catalysts, which would be over about 40 minutes at 170°C. The storage data reveals that arsonium compounds provide suitable pot life values, which would be between 20 to 200 days.

The effect of arsonium compounds on the electrical properties of the cured resin systems indicates acceptably low power factors and dielectric constants at 125°C and 150°C. Power factors of 4 to 8% at 125°C for these cured resins are substantially lower than those found for epoxy resins cured by a typical boron-trifluoride-monoethylamine complexes, where values of about 150% are usually found in the same temperature range and where values of about 600% are not unusual.

A comparison of power factor data of arsonium halides with phosphonium halides from TABLE 1 indicates significantly lower values, and comparable values with nonhalide phosphonium salts. Thus, the arsonium glycidyl ether bisphenol A epoxy resin:acid anhydride:-quaternary organic arsonium comound weight ratio of 100:100:0.16). The ingredients were reacted and cured exactly as in EXAMPLE 1.

Gel time measurements were made on 10 gram samples of catalyzed resin in 4 inch diameter aluminum dishes in a forced air oven at 170°C. The samples were inspected every 5 minutes and the approximate gel time was considered to be the time it took the formulation to start to solidify. The storage test was the same as in EXAMPLE 1. Gel time for the arsonium iodide and arsonium chloride catalyzed epoxies was about 10 minutes at 170°C. Pot life was about 60 days for the arsonium iodide catalyzed epoxy and about 70 days for the arsonium chloride catalyzed epoxy at 26°C. These results together with gel time and pot life data from EXAMPLES 1 and 2 indicate that suitable pot life values, between about 20 to 100 days and suitable gel time values, between about 5 to 40 minutes would require arsonium compound concentrations of between about 0.04 to 0.5 parts per 100 parts epoxy and 55 to 165 parts anhydride. Below 0.04 parts arsonium compound, the catalytic effect and gel time will be too high. Above 0.5 parts, the pot life would drop appreciably.

These results indicate that quaternary organic arsonium compounds, when added to an epoxy resin-anhydride system, within a critical weight ratio range, act as perfect latent accelerators, providing suitable pot life, rapid gel times and excellent electrical properties making them suitable in resinous casting compositions used in encapsulating and insulating electronic members such as electrical conductors and electrical windings disposed about the magnetic core in high voltage electrical transformers.

I claim:

1. A resinous composition suitable for insulating electrical members, comprising by weight:
   A. about 100 parts of an epoxy resin containing more than one 1,2 epoxy group per molecule,
   B. about 55 to 165 parts of an organic acid anhydride selected from the group consisting of monofunctional anhydrides and polyfunctional anhydrides effective as a curing agent for epoxy resins, and
   C. about 0.04 to 0.50 parts of a latent catalyst consisting essentially of a quaternary organic arsonium compound having the structural formula:

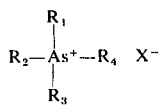

where $R_1$, $R_2$, $R_3$ and $R_4$ are selected from the group consisting of alkyl and aryl radicals having 1 to 21 carbon atoms and X is a halogen, radical.

2. The composition of claim 1, wherein the composition contains about 0.05 to 0.30 parts quaternary organic arsonium compound.

3. The composition of claim 1 wherein the epoxy resin comprises a resin selected from the group consisting of bisphenol A epoxy resins, novolac epoxy resins and mixtures thereof.

4. The composition of claim 3 also containing up to about 200 parts filler particles, of average particle sizes from about 10 to 300 microns, for 100 parts (A).

5. The composition of claim 3, wherein the epoxy resin contains up to about 70 parts epoxy reactive diluent and X is Cl, Br or I.

6. The composition of claim 5 being cured wherein the quaternary arsonium compounds are selected from the group consisting of triphenylarsonium iodide, tetraphenylarsonium chloride and mixtures thereof, the bisphenol A epoxy resin has an epoxy equivalent weight of from about 130 to 1200, the novolac epoxy resin has an epoxy equivalent weight of from about 100 to 500, the acid anhydride is selected from the group consisting of hexahydrophthalic anhydride, 1-methyl hexahydrophthalic anhydride, tetrahydrophthalic anhydride, 1-methyltetrahydrophthalic anhydride, phthalic anhydride, NADIC anhydride, NADIC methyl anhydride, pyromellitic dianhydride, polyazelaic polyanhydride, benzophenone tetracarboxylic acid dianhydride and mixtures thereof, and the epoxy resin contains about 20 to 50 parts neopentyl glycol diglycidylether reactive diluent.

7. The combination of an electrical member and a cured body of resinous insulation applied to the member, wherein the improvement comprises the insulation comprising the cured resinous composition of claim 3.

8. The combination of an insulated electrical transformer comprising a magnetic core, electrical windings disposed about the magnetic core and having a body of cured resinous insulation applied to the electrical windings, wherein the improvement comprises the insulation comprising the cured resinous composition of claim 3.

9. A cured resinous composition insulating electrical members, comprising by weight the reaction product of:
   A. about 100 parts of an epoxy resin containing more than one 1,2 epoxy group per molecule,
   B. about 55 to 165 parts of an anhydride selected from the group consisting of hexahydrophthalic anhydride, 1-methyl hexahydrophthalic anhydride, tetrahydrophthalic anhydride, 1-methyltetrahydrophthalic anhydride, phthalic anhydride, NADIC anhydride, NADIC methyl anhydride, pyromellitic dianhydride, polyazelaic polyanhydride, benzophenone tetracarboxylic acid dianhydride and mixtures thereof, and
   C. about 0.04 to 0.50 parts of a latent catalyst consisting essentially of a quaternary organic arsonium compound having the structural formula:

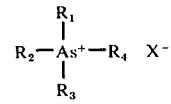

where $R_1$, $R_2$, $R_3$ and $R_4$ are selected from the group consisting of alkyl and aryl radicals having 1 to 21 carbon atoms and X is a halogen radical.

10. The resinous composition of claim 9 wherein the epoxy resin comprises a resin selected from the group consisting of bisphenol A epoxy resins, novolac epoxy resins and mixtures thereof, said resin containing about 20 to 50 parts of at least one epoxy reactive diluent selected from the group consisting of phenyl glycidyl ether, butyl glycidyl ether, alkyl glycidyl ethers, containing from 5 to 12 carbons, vinyl cyclohexene dioxide, endodlcyclopentadiene dioxide, octylene oxide and neopentyl glycol diglycidyl ether.

11. The composition of claim 9 wherein X is halogen and the electrical member is a metal selected from the group consisting of copper, iron and aluminum.

12. The combination of an electrical member and a cured body of resinous insulation applied to the member, wherein the improvement comprises the insulation comprising the cured resinous composition of claim 9.

13. The combination of an insulated electrical transformer comprising a magnetic core, electrical windings disposed about the magnetic core and having a body of cured resinous insulation applied to the electrical windings, wherein the improvement comprises the insulation comprising the cured resinous composition of claim 9.

14. The composition of claim 5, wherein X is Cl.

15. A resinous composition suitable for insulating electrical members, comprising by weight:
   A. about 100 parts of an epoxy resin containing more than one 1,2 epoxy group per molecule,
   B. about 55 to 165 parts of an acid anhydride selected from the group consisting of monofunctional anhydrides and polyfunctional anhydrides effective as a curing agent for epoxy resins, and
   C. about 0.04 to 0.50 parts of a latent catalyst consisting essentially of a quaternary organic arsonium compound selected from the group consisting of triphenylarsonium methyl iodide and tetraphenylarsonium chloride and mixtures thereof.

16. The resinous composition of claim 15, wherein the acid anhydride is selected from the group consisting of hexahydrophthalic anhydride, 1-methyl hexahydrophthalic anhydride, tetrahydrophthalic anhydride, 1-methyltetrahydrophthalic anhydride, phthalic anhydride, NADIC anhydride, NADIC methyl anhydride, pyromellitic dianhydride, polyazelaic polyanhydride, benzophenone tetracarboxylic acid dianhydride and mixtures thereof.

17. The resinous composition of claim 15, wherein the composition contains about 0.05 to 0.30 parts quaternary organic arsonium compound.

18. The resinous composition of claim 15, wherein the epoxy resin comprises a resin selected from the group consisting of bisphenol A epoxy resins, novolac epoxy resins and mixtures thereof.

19. The resinous composition of claim 15, also containing up to about 200 parts filler particles, of average particle sizes from about 10 to 300 microns, for 100 parts (A).

20. The resinous composition of claim 18, wherein the bisphenol A epoxy resin has an epoxy equivalent weight of from about 130 to 1200, the novolac epoxy resin has an epoxy equivalent weight of from about 100 to 500 and the composition is cured.

21. The resinous composition of claim 18, wherein the epoxy resin contains up to about 70 parts epoxy reactive diluent.

22. The combination of an electrical member and a cured body of resinous insulation applied to the member, wherein the improvement comprises the insulation comprising the cured composition of claim 15.

23. The combination of an insulated electrical transformer comprising a magnetic core, electrical windings disposed about the magnetic core and having a body of cured resinous insulation applied to the electrical windings, wherein the improvement comprises the insulation comprising the cured resinous composition of claim 15.

* * * * *